(12) United States Patent
Khamis et al.

(10) Patent No.: US 12,054,172 B2
(45) Date of Patent: Aug. 6, 2024

(54) VEHICLE OCCUPANT RISKY BEHAVIOR RECOGNITION AND RISK MITIGATION

(71) Applicant: GM GLOBAL TECHNOLOGY OPERATIONS LLC, Detroit, MI (US)

(72) Inventors: Alaa M. Khamis, Courtice (CA); Arief Barkah Koesdwiady, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 27 days.

(21) Appl. No.: 17/819,615

(22) Filed: Aug. 12, 2022

(65) Prior Publication Data

US 2024/0051560 A1    Feb. 15, 2024

(51) Int. Cl.
| | |
|---|---|
| *B60Q 9/00* | (2006.01) |
| *B60W 40/08* | (2012.01) |
| *B60W 50/14* | (2020.01) |
| *G06V 10/25* | (2022.01) |
| *G06V 20/56* | (2022.01) |
| *G06V 20/59* | (2022.01) |
| *G06V 40/10* | (2022.01) |
| *G06V 40/20* | (2022.01) |

(52) U.S. Cl.
CPC ............ *B60W 50/14* (2013.01); *B60W 40/08* (2013.01); *G06V 10/25* (2022.01); *G06V 20/56* (2022.01); *G06V 20/593* (2022.01); *G06V 40/103* (2022.01); *G06V 40/28* (2022.01); *B60W 2420/403* (2013.01); *B60W 2540/01* (2020.02); *B60W 2540/223* (2020.02)

(58) Field of Classification Search
USPC .... 340/438, 905, 539.1, 576, 439, 445–449, 340/488, 517, 545.6–545.9
See application file for complete search history.

(56) References Cited

U.S. PATENT DOCUMENTS

| | | | |
|---|---|---|---|
| 9,919,648 B1* | 3/2018 | Pedersen | G06V 20/56 |
| 11,193,312 B1* | 12/2021 | Weng | B60R 25/01 |
| 11,441,916 B1* | 9/2022 | Konrardy | G01C 21/3617 |
| 2011/0032096 A1* | 2/2011 | Miller | B60K 28/063 340/576 |
| 2019/0115049 A1* | 4/2019 | Shinoda | H04N 7/181 |
| 2020/0079310 A1* | 3/2020 | Kline | G01C 21/3461 |
| 2020/0302187 A1* | 9/2020 | Wang | H04L 25/0204 |
| 2021/0293572 A1* | 9/2021 | Konrardy | G08G 1/161 |
| 2022/0203996 A1* | 6/2022 | Katz | G06V 10/7715 |
| 2022/0355802 A1* | 11/2022 | Chaves | H04W 4/44 |
| 2023/0147714 A1* | 5/2023 | Shaik | H04L 63/20 726/25 |

\* cited by examiner

*Primary Examiner* — Daniel Previl
(74) *Attorney, Agent, or Firm* — Lorenz & Kopf LLP

(57) ABSTRACT

A vehicle including one or more interior image sensors, one or more exterior image sensors, and a controller configured to automatically detect occupant risky behavior is provided. The controller is configured to: detect whether a vehicle occupant exists who may pose a risk; determine whether a detected vehicle occupant in engaged in potentially risky behavior in an area of interest (AoI) based on image data from the one or more interior image sensors or the one or more exterior image sensors; determine whether the potentially risky behavior poses an actual risk; classify a level of risk when the potentially risky behavior poses an actual risk; and perform risk mitigation actions based on risk classification.

20 Claims, 8 Drawing Sheets

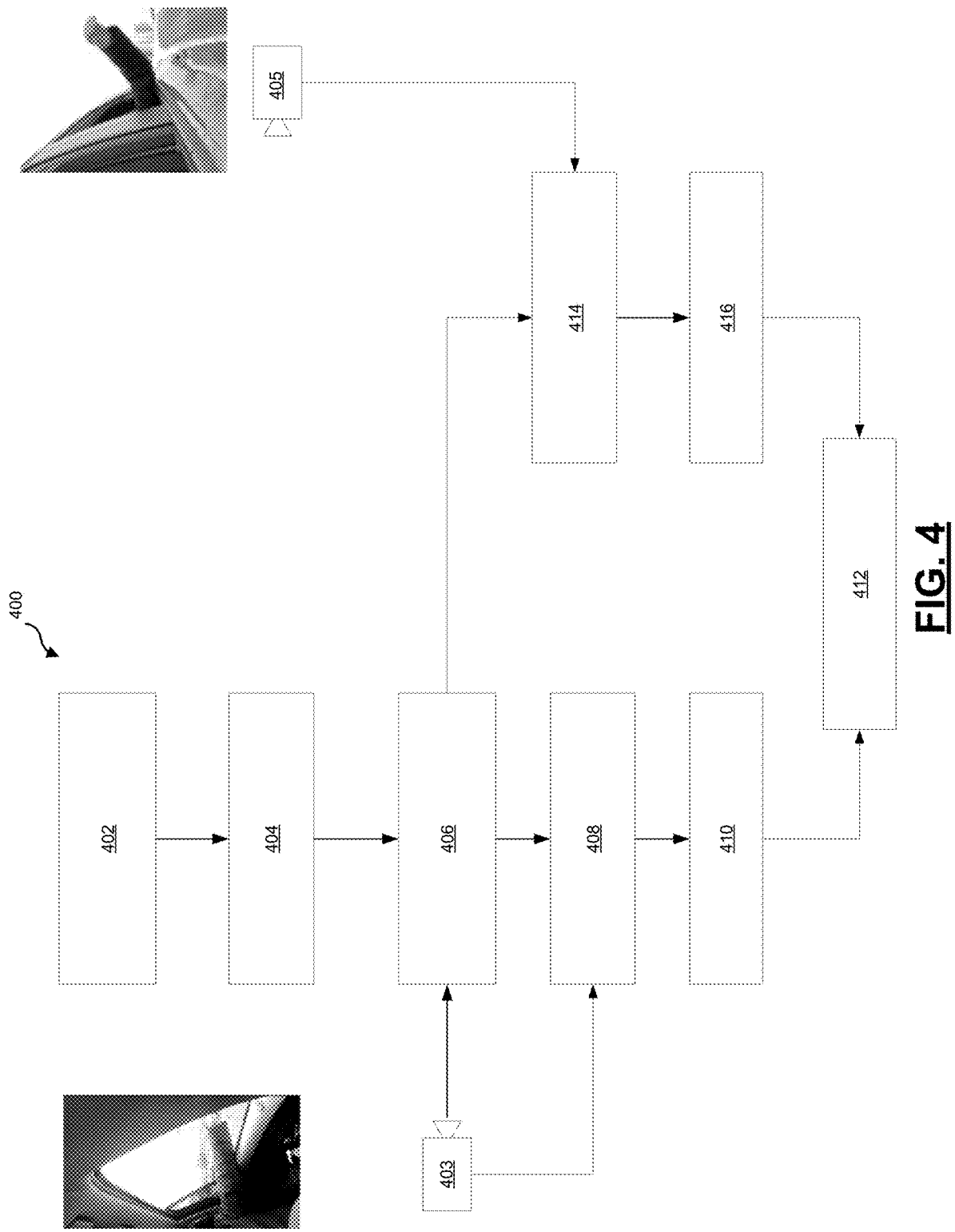

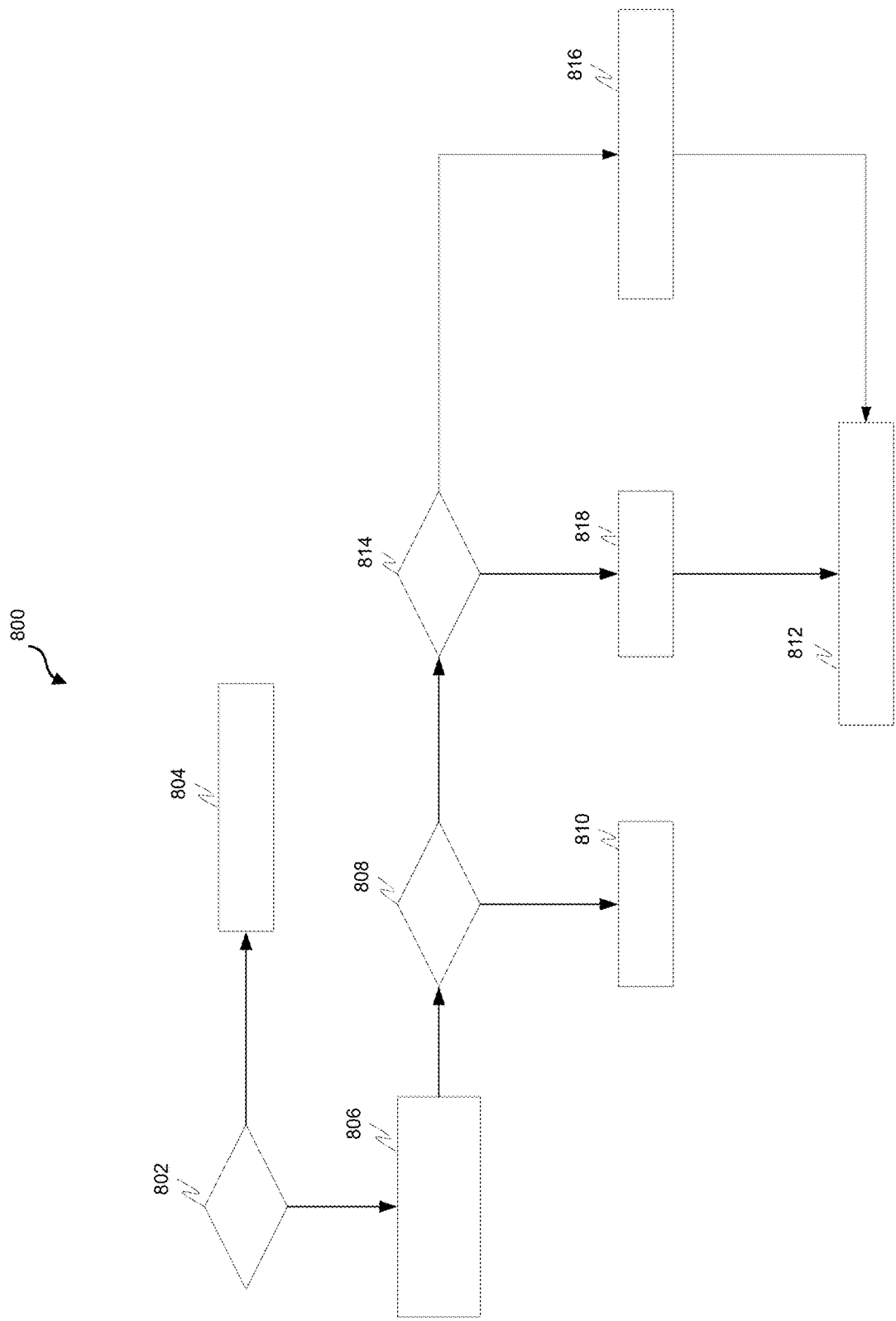

VEHICLE OCCUPANT RISKY BEHAVIOR RECOGNITION AND RISK MITIGATION

INTRODUCTION

The technical field generally relates to systems, methods, and apparatuses for providing risk assessment during vehicle operations and more particularly relates to systems, methods, and apparatuses for assessing risks due to risky occupant behavior.

Sticking extremities such as hand/elbow/arm/leg or head out of car window is a risky behavior that can result in accidents. Moreover, several countries prohibit passengers from placing limbs and other extremities out of windows and the offence can come with a costly fine. Moreover, this risky behavior can result in extremities collision with objects, eye exposure to dirt, rocks, dust and other debris, passenger (adult, child, or pet)'s ear damage due to high-speed winds and falling out specially during travelling over bumpy terrain.

It is therefore desirable for methods, systems, and apparatuses for detecting threat associated with sticking occupant extremities out of car windows and alert the occupant or the driver. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are a vehicle, methods, and systems for automatically detecting occupant risky behavior. In one embodiment, a risky behavior detection system in a vehicle for automatically detecting occupant risky behavior is provided. The risky behavior detection system including a controller. The controller is configured to: detect whether a vehicle occupant exists who may pose a risk; determine whether a detected vehicle occupant in engaged in potentially risky behavior in an area of interest (AoI); determine whether the potentially risky behavior poses an actual risk; classify a level of risk when the potentially risky behavior poses an actual risk; and perform risk mitigation actions based on risk classification.

In one embodiment of the risky behavior detection system, to detect whether a vehicle occupant exists who may pose a risk the controller is configured to determine whether a vehicle occupant is situated near a vehicle window and determine whether the vehicle window situated near the vehicle occupant is opened or closed.

In one embodiment of the risky behavior detection system, to determine whether a detected vehicle occupant in engaged in potentially risky behavior in an AoI, the controller is configured to: determine an occupant class for the detected vehicle occupant from a received image of an interior view of the vehicle near a window; generate a body skeleton with one or more extremities when the detected vehicle occupant is a human or pet; track the one or more extremities from the body skeleton; and detect if the one or more extremities are situated within the AoI.

In one embodiment of the risky behavior detection system, the AoI includes an inside window bounding polygon determined from internal vehicle sensors.

In one embodiment of the risky behavior detection system, the AoI includes an outside bounding box determined from exterior vehicle sensors.

In one embodiment of the risky behavior detection system, the AoI includes an inside window bounding polygon determined from internal vehicle sensors and an outside bounding box determined from exterior vehicle sensors.

In one embodiment of the risky behavior detection system, to determine whether the potentially risky behavior poses an actual risk, the controller is configured to: determine a maximum persistence time during which an extremity is detected as extending outside of a vehicle window; compare the maximum persistence time to a calibratable threat threshold; and determine a risk level based on a comparison of the maximum persistence time to the calibratable threat threshold.

In one embodiment of the risky behavior detection system, to determine a risk level based on a comparison of the maximum persistence time to the calibratable threat threshold, the controller is configured to: identify a threat level as not being at risk when the maximum persistence time is less than the calibratable threat threshold; and identify a threat level as being at risk when the maximum persistence time is greater than the calibratable threat threshold.

In one embodiment of the risky behavior detection system, to classify a level of risk when the potentially risky behavior poses an actual risk, the controller is configured to determine the level of risk based on an extremity type.

In one embodiment of the risky behavior detection system, to determine the level of risk based on the extremity type, the controller is configured to: determine that the level of risk is high when the extremity type includes a head, leg, or lower arm; and determine that the level of risk is low when the extremity type includes a finger or forearm and not a head, leg, or lower arm.

In one embodiment of the risky behavior detection system, to determine the level of risk based on the extremity type, the controller is configured to determine that the level of risk is high when the occupant is a child or pet, and a seatbelt for the occupant is not buckled.

In one embodiment of the risky behavior detection system, to perform risk mitigation actions based on risk classification, the controller is configured to: provide a vehicle driver with an alert and a recommendation to pull over when a high risk is detected; provide the driver with an alert when a low risk is detected, and the occupant is a child or a pet with a buckled seat belt; provide the occupant with an alert to avoid risky behavior when a low risk is detected, and the occupant is an adult; and deactivate window-up movement when risky behavior is detected.

In another embodiment a vehicle is provided. The vehicle includes, one or more interior image sensors, one or more exterior image sensors, and a controller. The controller is configured to: detect whether a vehicle occupant exists who may pose a risk; determine whether a detected vehicle occupant in engaged in potentially risky behavior in an area of interest (AoI) based on image data from the one or more interior image sensors or the one or more exterior image sensors; determine whether the potentially risky behavior poses an actual risk; classify a level of risk when the potentially risky behavior poses an actual risk; and perform risk mitigation actions based on risk classification.

In one embodiment of the vehicle, to detect whether a vehicle occupant exists who may pose a risk the controller is configured to determine whether a vehicle occupant is situated near a vehicle window and determine whether the vehicle window situated near the vehicle occupant is opened or closed.

In one embodiment of the vehicle, to determine whether a detected vehicle occupant in engaged in potentially risky behavior in an AoI, the controller is configured to: determine an occupant class for the detected vehicle occupant from a received image of an interior view of the vehicle near a window; generate a body skeleton with one or more extremities when the detected vehicle occupant is a human or pet; track the one or more extremities from the body skeleton; and detect if the one or more extremities are situated within the AoI.

In one embodiment of the vehicle, the AoI includes an inside window bounding polygon determined from internal vehicle sensors.

In one embodiment of the vehicle, the AoI includes an outside bounding box determined from exterior vehicle sensors.

In one embodiment of the vehicle, the AoI includes an inside window bounding polygon determined from internal vehicle sensors and an outside bounding box determined from exterior vehicle sensors.

In one embodiment of the vehicle, to determine whether the potentially risky behavior poses an actual risk, the controller is configured to: determine a maximum persistence time during which an extremity is detected as extending outside of a vehicle window; compare the maximum persistence time to a calibratable threat threshold; and determine a risk level based on a comparison of the maximum persistence time to the calibratable threat threshold.

In one embodiment of the vehicle, to determine a risk level based on a comparison of the maximum persistence time to the calibratable threat threshold, the controller is configured to: identify a threat level as not being at risk when the maximum persistence time is less than the calibratable threat threshold; and identify a threat level as being at risk when the maximum persistence time is greater than the calibratable threat threshold.

In one embodiment of the vehicle, to classify a level of risk when the potentially risky behavior poses an actual risk, the controller is configured to determine the level of risk based on an extremity type.

In one embodiment of the vehicle, to determine the level of risk based on the extremity type, the controller is configured to: determine that the level of risk is high when the extremity type includes a head, leg, or lower arm; and determine that the level of risk is low when the extremity type includes a finger or forearm and not a head, leg, or lower arm.

In one embodiment of the vehicle, to determine the level of risk based on the extremity type, the controller is configured to determine that the level of risk is high when the occupant is a child or pet, and a seatbelt for the occupant is not buckled.

In one embodiment of the vehicle, to perform risk mitigation actions based on risk classification, the controller is configured to: provide a vehicle driver with an alert and a recommendation to pull over when a high risk is detected; provide the driver with an alert when a low risk is detected, and the occupant is a child or a pet with a buckled seat belt; provide the occupant with an alert to avoid risky behavior when a low risk is detected, and the occupant is an adult; and deactivate window-up movement when risky behavior is detected.

In another embodiment, a method in a vehicle is provided. The method includes providing one or more interior image sensors; providing one or more exterior image sensors; detecting whether a vehicle occupant exists who may pose a risk; determining whether a detected vehicle occupant in engaged in potentially risky behavior in an area of interest (AoI) based on image data from the one or more interior image sensors or the one or more exterior image sensors; determining whether the potentially risky behavior poses an actual risk; classifying a level of risk when the potentially risky behavior poses an actual risk; and performing risk mitigation actions based on risk classification.

In one embodiment of the method, determining whether a detected vehicle occupant is in engaged in potentially risky behavior in an AoI, includes: determining an occupant class for the detected vehicle occupant from a received image of an interior view of the vehicle near a window; generating a body skeleton with one or more extremities when the detected vehicle occupant is a human or pet; tracking the one or more extremities from the body skeleton; and detecting if the one or more extremities are situated within the AoI.

In one embodiment of the method, the AoI includes an inside window bounding polygon determined from internal vehicle sensors and an outside bounding box determined from exterior vehicle sensors.

In one embodiment of the method, determining whether the potentially risky behavior poses an actual risk includes: determining a maximum persistence time during which an extremity is detected as extending outside of a vehicle window; comparing the maximum persistence time to a calibratable threat threshold; and determining a risk level based on a comparison of the maximum persistence time to the calibratable threat threshold.

In one embodiment of the method, determining a risk level based on a comparison of the maximum persistence time to the calibratable threat threshold includes: identifying a threat level as not being at risk when the maximum persistence time is less than the calibratable threat threshold; and identifying a threat level as being at risk when the maximum persistence time is greater than the calibratable threat threshold.

In one embodiment of the method, classifying a level of risk when the potentially risky behavior poses an actual risk includes determining the level of risk based on an extremity type and determining the level of risk based on the extremity type includes determining that the level of risk is high when the extremity type includes a head, leg, or lower arm, and determining that the level of risk is low when the extremity type includes a finger or forearm and not a head, leg, or lower arm.

In one embodiment of the method, performing risk mitigation actions based on risk classification includes: providing a vehicle driver with an alert and a recommendation to pull over when a high risk is detected; providing the driver with an alert when a low risk is detected, and the occupant is a child or a pet with a buckled seat belt; providing the occupant with an alert to avoid risky behavior when a low risk is detected, and the occupant is an adult; and deactivating window-up movement when risky behavior is detected.

BRIEF DESCRIPTION OF THE DRAWINGS

The exemplary embodiments will hereinafter be described in conjunction with the following drawing figures, wherein like numerals denote like elements, and wherein:

FIG. 4 is a process flow chart depicting an example process in a vehicle for automatic detection of occupant risky behavior and for taking a mitigating action, in accordance with an embodiment;

FIG. 8 is a process flow chart depicting an example process for determining the type of risk mitigation efforts to undertake based on the determined risk level posed by a detected potential risk, in accordance with an embodiment.

DETAILED DESCRIPTION

Figure 1:
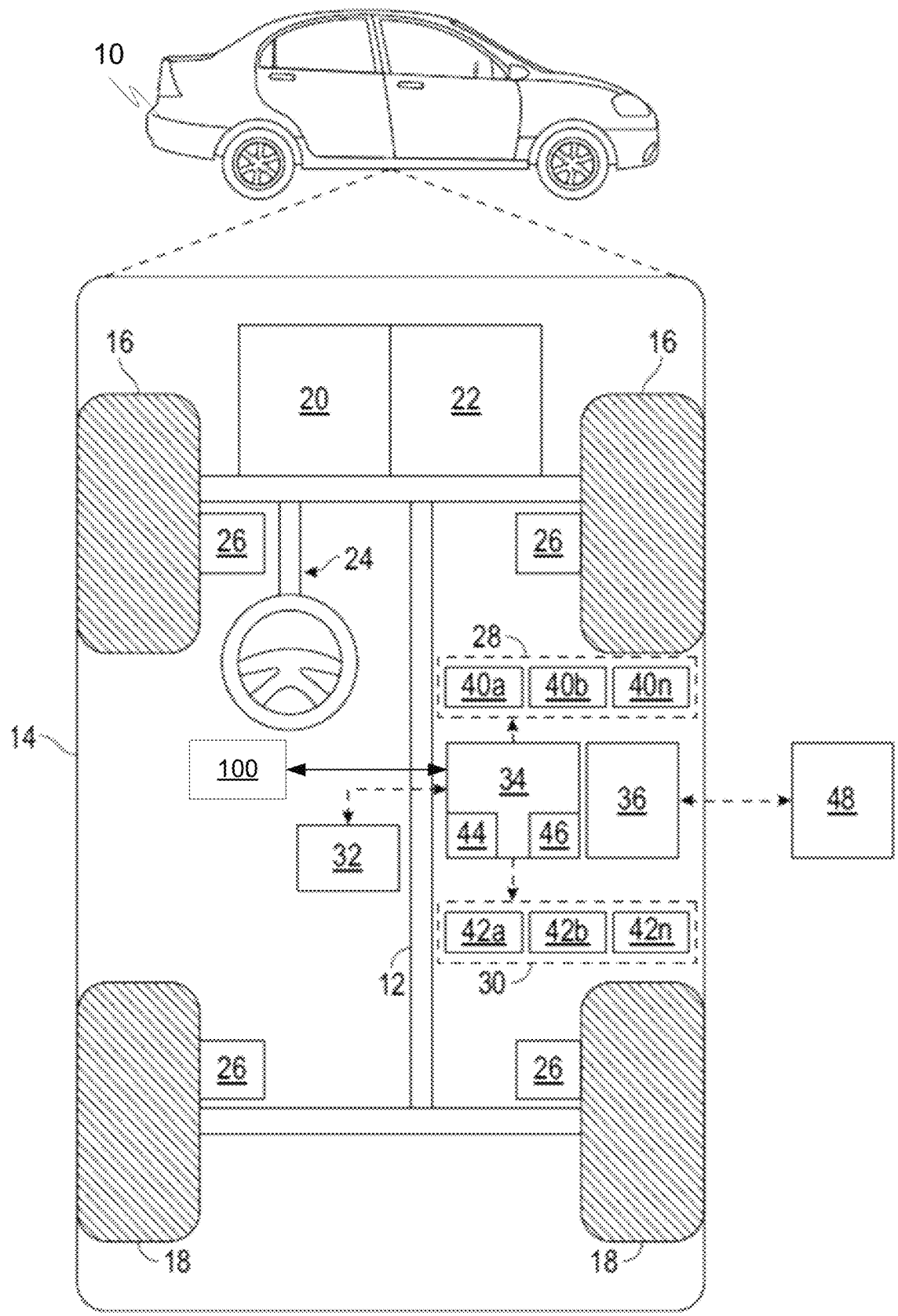
FIG. 1 is a diagram depicting an example vehicle that includes a risky behavior detection system for automatic detection of occupant risky behavior, in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In various embodiments, apparatus, systems, techniques, and articles are disclosed for automatic detection of occupant risky behavior, such as an occupant sticking a body extremity out of a vehicle window, and for alerting the occupant and/or vehicle driver about the occupant risky behavior so that the risky behavior may be terminated.

In various embodiments, an interior cabin camera and/or Occupant Monitoring System (OMS) camera is used to detect and track occupant extremities using body skeleton detection and tracking algorithms. In various embodiments, it will be determined that risky behavior has been detected when an occupant's extremity (e.g., forearm, fingers, lower arm, head, or legs) is detected within a window bounding polygon from inside the vehicle for a specific time duration that exceeds a calibratable risk threshold within a calibratable time window. In various embodiments, the window bounding polygon is estimated based on window region detection from an interior cabin camera data or based on a predefined 3D Geometric Model of the vehicle.

In various embodiments, exterior surround view cameras are used to detect extremities outside a vehicle window and its extent g body skeleton detection and tracking algorithms. In various embodiments, it will be determined that risky behavior has been detected when an occupant's extremity (e.g., forearm, fingers, lower arm, head, or legs) is detected within a specific area of interest outside the vehicle for a specific time duration that exceeds a calibratable risk threshold within a calibratable time window.

In various embodiments, persistence times during which extremities are detected as extending outside of a vehicle window are tracked. In various embodiments, a maximum persistence time is determined from the tracked persistence times. In various embodiments, the maximum persistence time is compared to a calibratable threat threshold, and when the maximum persistence time is less than the threat threshold, it is determined that the threat level should indicate "No Risk". When the maximum persistence time is greater than or equal to the threat threshold, it is determined that the threat level should indicate a risk—e.g., high or low risk.

In various embodiments, a level of risk is determined based on the type of detected and persistent extremities extended out of a window. In various embodiments, when a head, leg, or lower arm is detected as being extended out of a window, the risk is determined to be high. In various embodiments, when fingers and/or a forearm is detected as being extended out of a window, the risk is determined to be low.

In various embodiments, the determination to provide an alert to the occupant and/or driver is based on the occupant class and seat belt status. In various embodiments, when the occupant is a child or pet and the seatbelt is not buckled, the driver is provided with an alert and provided with a recommendation to pull over when a risk is detected. In various embodiments, when the occupant is a child or a pet and the seat belt is buckled, the driver is provided with an alert when a risk is detected. In various embodiments, when the occupant is an adult, the occupant is provided an alert to avoid risk behavior. In various embodiments, the window-up movement is deactivated when risky behavior is detected.

In various embodiments, apparatus, systems, techniques, and articles disclosed herein can provide for enhanced safety in both non-automated and automated vehicles. In various embodiments, apparatus, systems, techniques, and articles disclosed herein can allow vehicle operators and/or owners to avoid costly fines occasioned by traffic violations.

FIG. 1 is a diagram depicting an example vehicle 10 that includes a risky behavior detection system 100 for automatic detection of occupant risky behavior, such as an occupant sticking a body extremity out of a vehicle window, and for alerting the occupant and/or vehicle driver about the occupant risky behavior so that the risky behavior may be terminated. As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40r that sense observable conditions of the exterior environment and/or the interior environment of the autonomous vehicle 10. The sensing devices 40a-40n can include but are not limited to, radars, lidars, global positioning systems, optical cameras, thermal cameras, ultrasonic sensors, inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to continuously calculate controllable steering angles for directing the articulated transport system to direct the final trailer in a desired direction and control the articulated transport system to direct the final trailer in the desired direction using the calculated controllable steering angles.

The risky behavior detection system 100 may include any number of sub-modules embedded within the controller 34, which may be combined and/or further partitioned to similarly implement systems and methods described herein. Additionally, inputs to the risky behavior detection system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
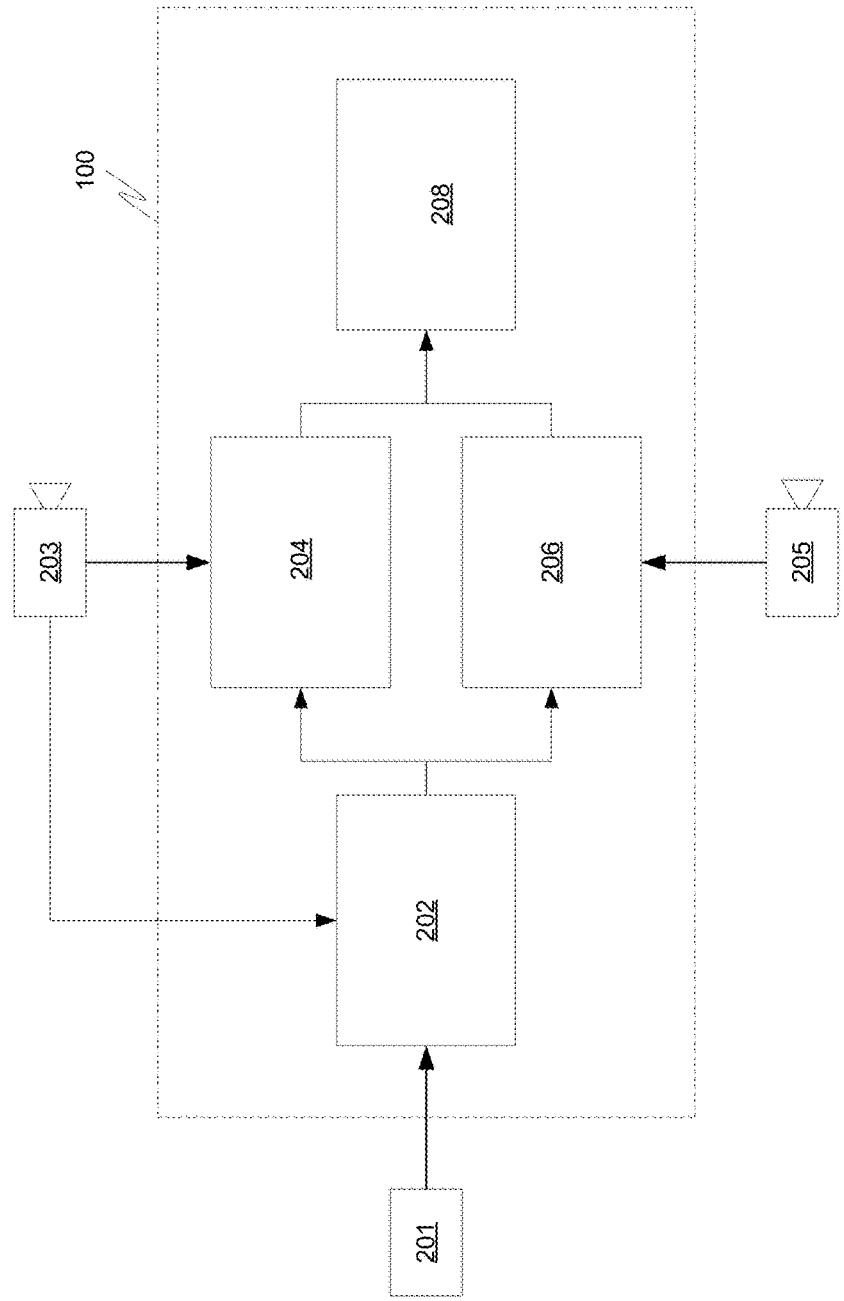
FIG. 2 is a block diagram depicting an example risky behavior detection system in a vehicle for automatic detection of occupant risky behavior and for providing an alert regarding the occupant risky behavior, in accordance with an embodiment.

FIG. 2 is a block diagram depicting an example risky behavior detection system 100 in a vehicle for automatic detection of occupant risky behavior and for providing an alert regarding the occupant risky behavior. The example risky behavior detection system 100 includes an occupant identification module 202, interior risk assessment module 204, an exterior risk assessment module 206, and an alert and risk mitigation module 208. The occupant identification module 202 is configured to determine whether vehicle occupants exist who may pose a risk. The interior risk assessment module 204 is configured to determine whether a vehicle occupant potentially poses a risk using internal vehicle sensors. The exterior risk assessment module 206 is configured to determine whether a vehicle occupant potentially poses a risk using internal vehicle sensors. The alert and risk mitigation module 208 is configured to determine whether a potential risk posed by a vehicle occupant is an actual risk, classify the level of risk, and take risk mitigation actions. The example risky behavior detection system 100 including the occupant identification module 202, interior risk assessment module 204, exterior risk assessment module 206, and alert and risk mitigation module 208 are each implemented by a controller (e.g., the same, separate, or multiple controllers).

The occupant identification module 202 is configured to identify, based on input from one or more vehicle occupancy sensor(s) 201, whether a vehicle occupant exists who may pose a risk. The vehicle occupancy sensor(s) may take the form of those known in the art, such as sensors based on RF-CMOS technology, or other forms. The example occupant identification module 202 may determine if identified vehicle occupants exist who are situated near a vehicle window. If it is determined that an identified vehicle occupant is situated near a vehicle window, the example occupant identification module 202 may further determine whether the vehicle window adjacent to the identified vehicle occupant is opened or closed. An identified vehicle occupant who is situated adjacent to an open window may be designated for monitoring as a monitored vehicle occupant.

The interior risk assessment module 204 is configured to determine whether a monitored vehicle occupant potentially poses a risk using one or more internal vehicle sensor(s) 203. The one or more internal vehicle sensor(s) 203 may include interior cabin sensors (e.g., optical sensors, cameras, or infrared (IR) sensors) and/or occupant monitoring system (OMS) sensors (e.g., OMS optical sensors, cameras, or IR sensors). The interior risk assessment module 204 is configured to receive an image of an interior view of the vehicle near a window, determine the class of occupant (e.g., cargo, pet, human adult, human child), generate a body skeleton for a human or pet occupant adjacent to the window based on the image and detect occupant extremities (e.g., forearm, fingers, lower arm, head, or legs), generate an inside window bounding polygon around the window opening, and detect if occupant extremities extend into the window bounding polygon. Detected occupant extremities in the inside window bounding polygon are tracked to check the persistency and a level of risky behavior. Body skeleton generation and occupant extremities tracking may be performed using algorithms known in the art, such as PoseNet, DeepPose, OpenPose, or other algorithms.

Figure 3B:
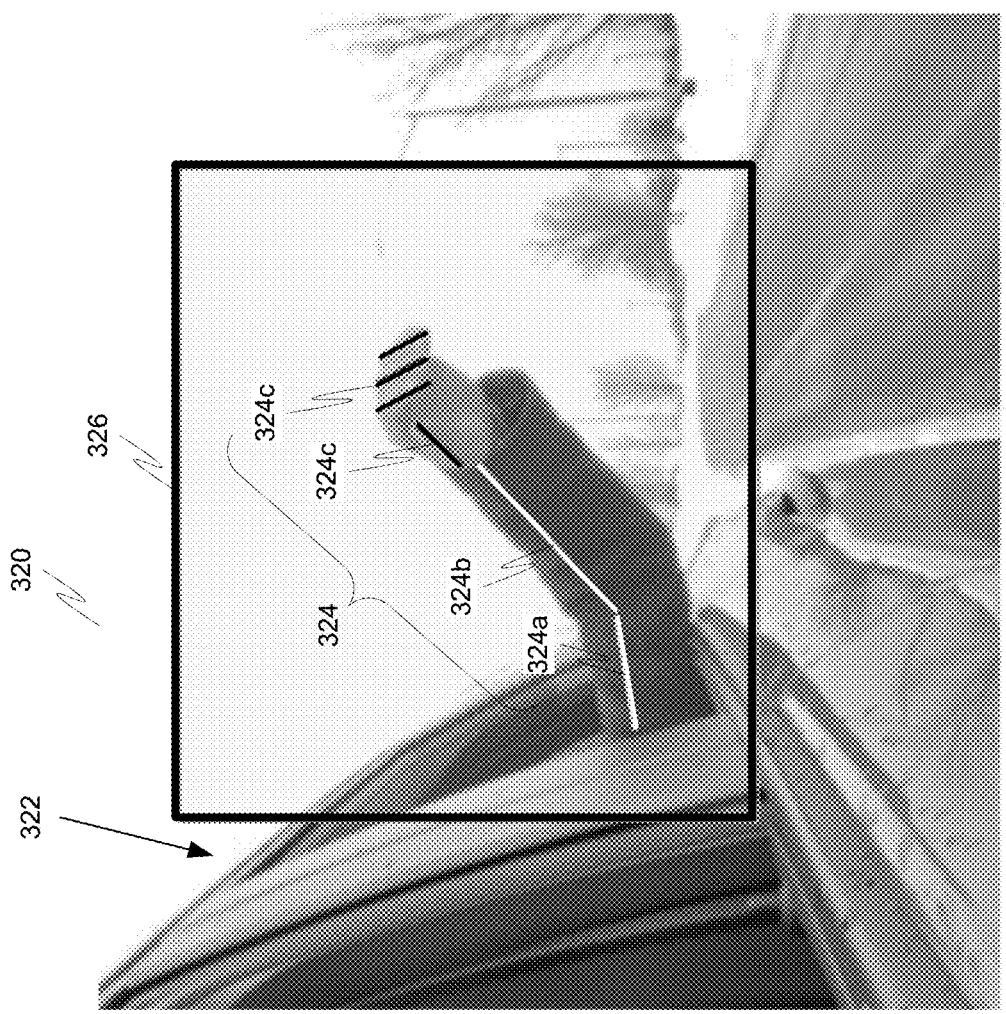
FIG. 3B is a diagram depicting an example operating scenario for an exterior risk assessment module, in accordance with an embodiment.
Figure 3A:
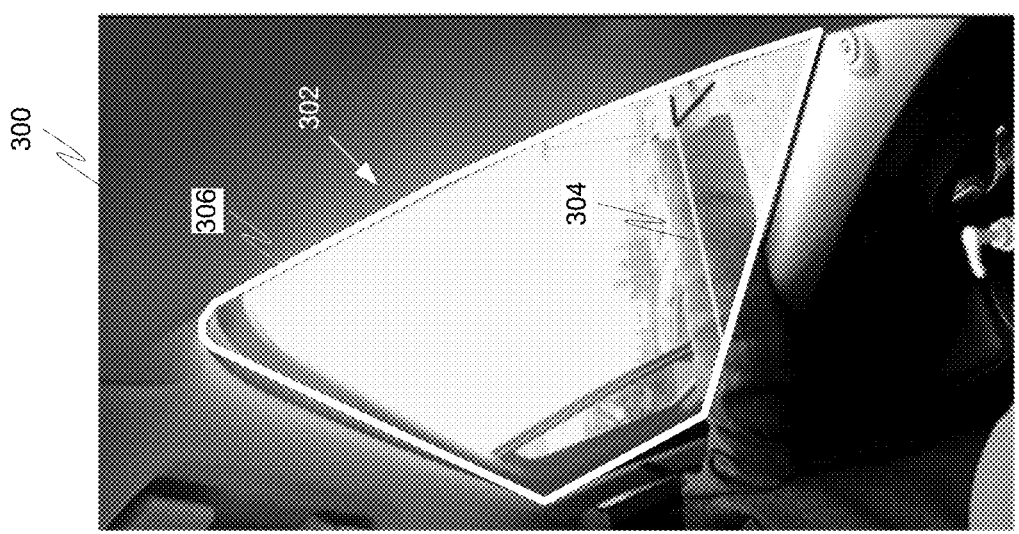
FIG. 3A is a diagram depicting an example operating scenario for an interior risk assessment module, in accordance with an embodiment.

FIG. 3A is a diagram depicting an example operating scenario for the interior risk assessment module 204. In this example, an image 300 of an interior view of the vehicle near a window 302 generated from one or more internal vehicle sensor(s) 203 is received by the interior risk assessment module 204. The example interior risk assessment module 204 generates an inside window bounding polygon 306 around the window opening, generates a body skeleton for the vehicle occupant adjacent to the window 302 based on the image 300, detects occupant extremities 304 (e.g., forearm, fingers, lower arm), and detects that occupant extremities 304 extend into the window bounding polygon 306.

Referring back to FIG. 2, the exterior risk assessment module 206 is configured to determine whether a monitored vehicle occupant potentially poses a risk using one or more exterior vehicle sensor(s) 205 (such as side cameras). The exterior risk assessment module 206 is configured to receive an image of the exterior of the vehicle near a window, determine the class of occupant (e.g., cargo, pet, human adult, human child), generate a body skeleton for a human or pet occupant adjacent to the window based on the image and detect occupant extremities (e.g., forearm, fingers, lower arm, head, or legs), generate an outside bounding box near a window opening, and detect if occupant extremities extend into the outside bounding box. Detected occupant extremities in the outside bounding box are tracked to check the persistency and a level of risky behavior. Body skeleton generation and occupant extremities tracking may be performed using algorithms known in the art, such as PoseNet, DeepPose, OpenPose, or other algorithms.

FIG. 3B is a diagram depicting an example operating scenario for the exterior risk assessment module 206. In this example, an image 320 of the exterior of the vehicle near a window 322 generated from one or more exterior vehicle sensor(s) 205 is received by the exterior risk assessment module 206. The example exterior risk assessment module 206 generates an outside bounding box 326 near the window opening, generates a body skeleton for the vehicle occupant adjacent to the window 322 based on the image 320, detects occupant extremities 324 (e.g., lower arm 324a, forearm 324b, fingers 324c), and detects that occupant extremities 324 extend into the outside bounding box 326.

Referring back to FIG. 2, the alert and risk mitigation module 208 is configured to determine whether a potential risk posed by a vehicle occupant is an actual risk, classify the level of risk, and take risk mitigation actions. The occupant/driver will be alerted, and risk mitigation action will be recommended based on the class of occupant (adult/child/pet) and the level of risk.

FIG. 4 is a process flow chart depicting an example process 400 in a vehicle (e.g., in a risky behavior detection system 100) for automatic detection of occupant risky behavior and for taking a mitigating action. The order of operation within process 400 is not limited to the sequential execution as illustrated in the FIG. 4 but may be performed in one or more varying orders as applicable and in accordance with the present disclosure.

At operation 402, the example process 400 includes checking in-cabin vehicle occupancy status. Checking in-cabin vehicle occupancy status may include identifying, based on input from one or more vehicle occupancy sensor(s), whether a vehicle occupant exists who may pose a risk. The vehicle occupancy sensor(s) may take the form of those known in the art, such as sensors based on RF-CMOS technology, or other forms. Checking in-cabin vehicle occupancy status may include determining if identified vehicle occupants exist who are situated near a vehicle window.

At operation 404, the example process 400 includes checking window status. Checking window status may be performed when it is determined that an identified vehicle occupant is situated near a vehicle window. Checking window status may also include determining whether the vehicle window adjacent to the identified vehicle occupant is opened or closed. An identified vehicle occupant who is situated adjacent to an open window may be designated for monitoring as a monitored vehicle occupant.

At operation 406, the example process 400 includes determining an occupant class identification for a monitored vehicle occupant. The determining an occupant class identification may be made based on analysis of image data from an interior image sensor(s) 403 (such as vehicle occupancy sensor(s) 201 and/or internal vehicle sensor(s) 203). Determining an occupant class identification for a monitored vehicle occupant may include determining whether the monitored vehicle occupant is a living being (e.g., human or pet) or cargo. When the monitored vehicle occupant is a living being, determining an occupant class identification may include determining whether the living being is a pet, human adult, or human child. Other occupant class identifications may be made in other examples. Determining an occupant class identification for a monitored vehicle occupant may be performed using artificial intelligence (AI) object recognition and/or classification techniques, machine learning techniques, computer vision techniques, and others.

At operation 408, the example process 400 includes body skeleton detection and tracking. Body skeleton detection and tracking may include generating a body skeleton for a human or pet occupant adjacent to a window based on image data from an interior image sensor(s) 403 and detecting occupant extremities (e.g., forearm, fingers, lower arm, head, or legs). Body skeleton detection and tracking may further include generating an inside window bounding polygon around the window opening and detecting if occupant extremities extend into the window bounding polygon. Body skeleton detection and tracking may further include tracking detected occupant extremities in the inside window bounding polygon for persistency and a level of risky behavior. Body skeleton detection and tracking may be performed using algorithms known in the art, such as PoseNet, DeepPose, OpenPose, or other algorithms.

At operation 410, the example process 400 includes interior risk assessment. Interior risk assessment may include tracking persistence times during which extremities are detected as extending outside of a vehicle window. Interior risk assessment may include determining a maximum persistence time during which extremities are detected as extending outside of a vehicle window, comparing the maximum persistence time to a calibratable threat threshold, and determining a risk level based on the comparison of the maximum persistence time to the calibratable threat threshold. When the maximum persistence time is less than the threat threshold, interior risk assessment may include determining that the threat level is "No Risk". When the maximum persistence time is greater than the threat threshold, interior risk assessment may include determining that the threat level is "At Risk".

At operation 412, the example process 400 includes alert and risk mitigation when an "At Risk" state has been determined. Alert and risk mitigation may include determining a level of risk based on the type of detected and persistent extremities extended out of a window. Alert and risk mitigation may include determining that the level of risk is high when a head, leg, or lower arm is detected as being extended out of a window. Alert and risk mitigation may include determining that a level of risk is high when the occupant is a child or pet, and a seatbelt for the occupant is not buckled. Alert and risk mitigation may include determining that the level of risk is low when fingers and/or a forearm is detected as being extended out of a window.

Alert and risk mitigation may further include determining the type of risk mitigation action to undertake. Alert and risk mitigation may include providing a driver with an alert and a recommendation to pull over when a high risk is detected. Alert and risk mitigation may include providing a driver with an alert when a low risk is detected, and the occupant is a child or a pet with a buckled seat belt. Alert and risk mitigation may include providing an occupant with an alert to avoid risky behavior when a low risk is detected, and the occupant is an adult. Alert and risk mitigation may include deactivating window-up movement when risky behavior is detected.

At operation 414, the example process 400 includes body skeleton detection and tracking based on image data from an exterior side image sensor(s) 405. Body skeleton detection and tracking may include receiving image data of the exterior of the vehicle near a window from exterior side image sensor(s) 405, generating a body skeleton for a human or pet occupant adjacent to the window based on the image data, detecting occupant extremities (e.g., forearm, fingers, lower arm, head, or legs) from the body skeleton, generating an outside bounding box near a window opening, and detecting if occupant extremities extend into the outside bounding box. Body skeleton detection and tracking may further include tracking detected occupant extremities in the outside bounding box for persistency and a level of risky behavior. Body skeleton detection and tracking may be performed using algorithms known in the art, such as PoseNet, DeepPose, OpenPose, or other algorithms.

At operation 416, the example process 400 includes exterior risk assessment. Exterior risk assessment may include tracking persistence times during which extremities are detected as extending in the outside bounding box. Exterior risk assessment may include determining a maximum persistence time during which extremities are detected as extending in the outside bounding box, comparing the maximum persistence time to a calibratable threat threshold, and determining a risk level based on the comparison of the maximum persistence time to the calibratable threat threshold. When the maximum persistence time is less than the threat threshold, exterior risk assessment may include determining that the threat level is "No Risk". When the maximum persistence time is greater than the threat threshold, exterior risk assessment may include determining that the threat level is "At Risk". After exterior risk assessment, alert and risk mitigation operations 412 are undertaken.

Figure 5:
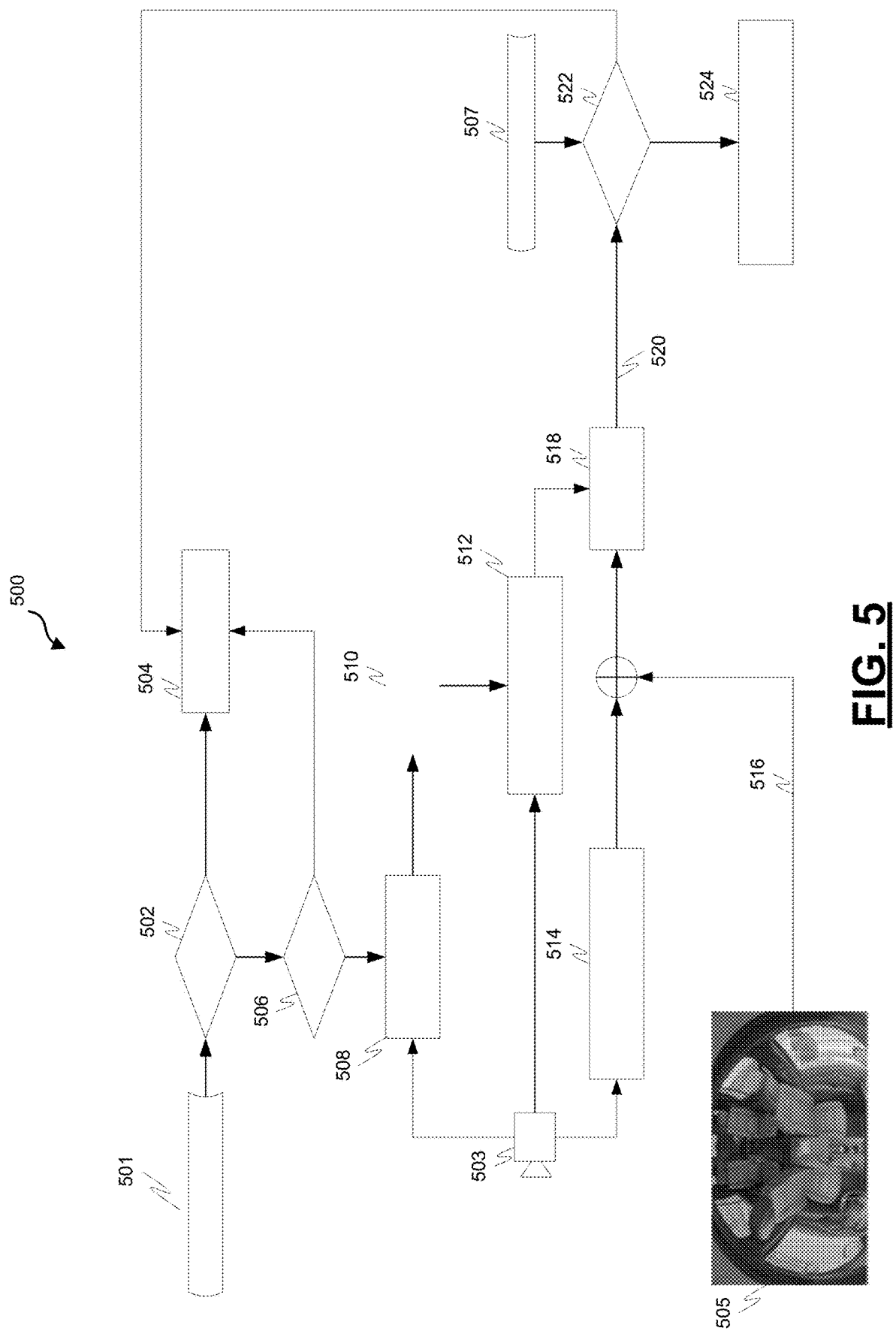
FIG. 5 is a process flow chart depicting an example process for determining whether a vehicle occupant potentially poses a risk using internal vehicle sensors, in accordance with an embodiment.

FIG. 5 is a process flow chart depicting an example process 500 (e.g., in connection with an interior risk assessment module 204) for determining whether a vehicle occupant potentially poses a risk using internal vehicle sensors. The order of operation within process 500 is not limited to the sequential execution as illustrated in the FIG. 5 but may be performed in one or more varying orders as applicable and in accordance with the present disclosure.

At decision 502, the example process 500 includes determining whether a vehicle occupant exists who may pose a risk. The determining may be performed based on input from one or more vehicle occupancy sensor(s) 501. The determining may include determining if identified vehicle occupants exist who are situated near a vehicle window. When it is determined that a vehicle occupant does not exist who may pose a risk (no at decision 502), the example process 500 includes doing nothing (operation 504).

When it is determined that a vehicle occupant exists who may pose a risk (yes at decision 502), the example process 500 includes determining, at decision 506, the status (e.g., opened or closed) of a vehicle window near the identified vehicle occupant. When it is determined (at decision 506) that the vehicle window near the identified vehicle occupant is fully closed, the example process 500 includes doing nothing (operation 504).

When it is determined (at decision 506) that the vehicle window near the identified vehicle occupant is fully or partially opened, the example process 500 includes, at operation 508, identifying the occupant class of the identified vehicle occupant, based on sensor data from internal image sensors 503 (such as vehicle occupancy sensor(s) 201 and/or internal vehicle sensor(s) 203). Identifying an occupant class identification for an identified vehicle occupant may be performed using artificial intelligence (AI) object recognition and/or classification techniques, machine learning techniques, computer vision techniques, and others.

At decision 510, the example process 500 includes determining whether further action is needed based on the identified occupant class. When the identified occupant class is cargo, the example process 500 includes doing nothing (operation 504).

When the identified occupant class is human or pet, the example process 500 includes, at operation 512, performing body skeleton detection and tracking using image data (e.g., K-image sequence data) from the interior image sensors 503. Performing body skeleton detection and tracking may include generating a body skeleton for a human or pet occupant adjacent to a window based on image data from an interior image sensor(s) 503 and detecting occupant extremities (e.g., forearm, fingers, lower arm, head, or legs). Performing body skeleton detection and tracking may be performed using algorithms known in the art, such as PoseNet, DeepPose, OpenPose, or other algorithms.

At operation 514, the example process 500 includes performing window region detection operations around a window opening from image data to identify objects (such as occupant extremities) within the window region. Performing window region detection operations may include using image processing techniques based on optical flow, segmentation, or edge detection.

At operation 516, the example process 500 includes generating an inside window bounding polygon around a window opening from image data. The inside window bounding polygon around a window opening may be generated from a three dimensional (3D) geometric model of the vehicle interior 505, for example, from stitched together images from interior image sensors 503.

At operation 518, the example process 500 includes detecting if occupant extremities extend into the window bounding polygon. Detecting if occupant extremities extend into the window bounding polygon may be performed by comparing the window bounding polygon output to the output from the window region detection operations to determine an intersection. The overlapping output identifies detected occupant extremities 520 that extend outside the vehicle.

At decision 522, the example process 500 includes determining whether a risk exists due to detected extremities extending out of a vehicle window, based on a calibratable threshold 507. Determining whether a risk exists due to detected extremities extending out of a vehicle window may include performing interior risk assessment. Performing interior risk assessment may include tracking persistence times during which extremities are detected as extending outside of a vehicle window. Interior risk assessment may include determining a maximum persistence time during which extremities are detected as extending outside of a vehicle window, comparing the maximum persistence time to a calibratable threat threshold, and determining a risk level based on the comparison of the maximum persistence time to the calibratable threat threshold. When the maximum persistence time is less than the threat threshold, interior risk assessment may include determining that the threat level is "No Risk". When the maximum persistence time is greater than the threat threshold, interior risk assessment may include determining that the threat level is "At Risk".

When it is determined that a risk does not exist (no at decision 522), the example process includes doing nothing (operation 504). When it is determined that a risk does exist (yes at decision 522), the example process includes performing alert and risk mitigation operations (operation 524). Performing alert and risk mitigation may include determining a level of risk based on the type of detected and persistent extremities extended out of a window. Performing alert and risk mitigation and risk mitigation may include determining that the level of risk is high when a head, leg, or lower arm is detected as being extended out of a window. Performing alert and risk mitigation and risk mitigation may include determining that a level of risk is high when the occupant is a child or pet, and a seatbelt for the occupant is not buckled. Performing alert and risk mitigation and risk mitigation may include determining that the level of risk is low when fingers and/or a forearm is detected as being extended out of a window.

Performing alert and risk mitigation and risk mitigation may further include determining the type of risk mitigation action to undertake. Performing alert and risk mitigation and risk mitigation may include providing a driver with an alert and a recommendation to pull over when a high risk is detected. Performing alert and risk mitigation and risk mitigation may include providing a driver with an alert when a low risk is detected, and the occupant is a child or a pet with a buckled seat belt. Performing alert and risk mitigation and risk mitigation may include providing an occupant with an alert to avoid risky behavior when a low risk is detected, and the occupant is an adult. Performing alert and risk mitigation and risk mitigation may include deactivating window-up movement when risky behavior is detected.

Figure 6:
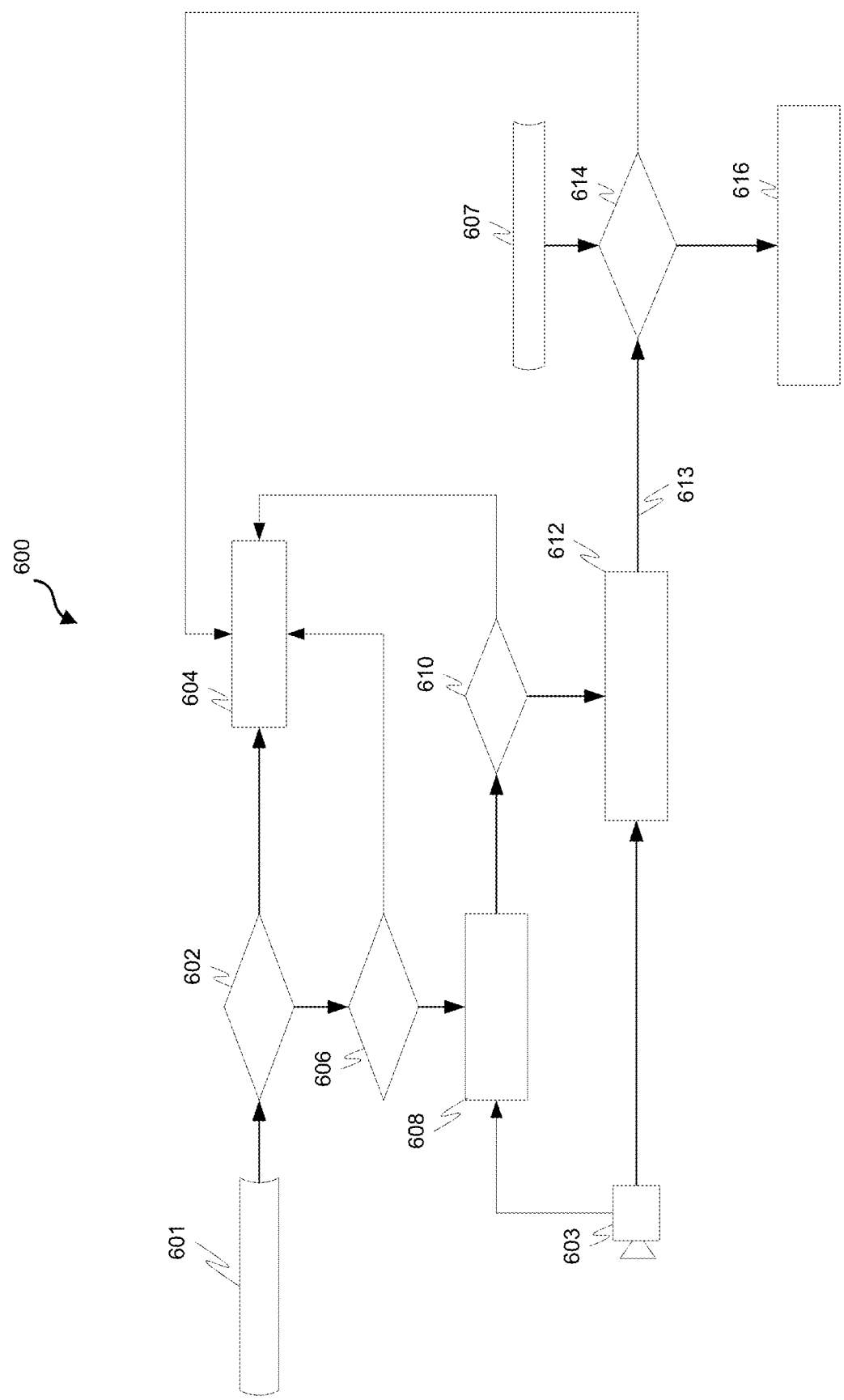
FIG. 6 is a process flow chart depicting an example process for determining whether a vehicle occupant potentially poses a risk using exterior vehicle sensors, in accordance with an embodiment.

FIG. 6 is a process flow chart depicting an example process 600 (e.g., in connection with an exterior risk assessment module 206) for determining whether a vehicle occupant potentially poses a risk using exterior vehicle sensors. The order of operation within process 600 is not limited to the sequential execution as illustrated in the FIG. 6 but may be performed in one or more varying orders as applicable and in accordance with the present disclosure.

At decision 602, the example process 600 includes determining whether a vehicle occupant exists who may pose a risk. The determining may be performed based on input from one or more vehicle occupancy sensor(s) 601. The determining may include determining if identified vehicle occupants exist who are situated near a vehicle window. When it is determined that a vehicle occupant does not exist who may pose a risk (no at decision 602), the example process 600 includes doing nothing (operation 604).

When it is determined that a vehicle occupant exists who may pose a risk (yes at decision 602), the example process 600 includes determining, at decision 606, the status (e.g., opened or closed) of a vehicle window near the identified vehicle occupant. When it is determined (at decision 606) that the vehicle window near the identified vehicle occupant is fully closed, the example process 600 includes doing nothing (operation 604).

When it is determined (at decision 606) that the vehicle window near the identified vehicle occupant is fully or partially opened, the example process 600 includes, at operation 608, identifying the occupant class of the identified vehicle occupant, based on sensor data from exterior side image sensor(s) 603 (such as exterior side image sensor(s) 405). Identifying an occupant class identification for an identified vehicle occupant may be performed using artificial intelligence (AI) object recognition and/or classification techniques, machine learning techniques, computer vision techniques, and others.

At decision 610, the example process 600 includes determining whether further action is needed based on the identified occupant class. When the identified occupant class is cargo, the example process 600 includes doing nothing (operation 604).

When the identified occupant class is human or pet, the example process 600 includes, at operation 612, performing body skeleton detection and tracking using image data (e.g., K-image sequence data) from the exterior side image sensor(s) 603. Performing body skeleton detection and tracking may include receiving image data of the exterior of the vehicle near a window from exterior side image sensor(s) 603, generating a body skeleton for a human or pet occupant adjacent to the window based on the image data, detecting occupant extremities (e.g., forearm, fingers, lower arm, head, or legs) from the body skeleton, generating an outside bounding box near a window opening, and detecting if occupant extremities extend into the outside bounding box. Body skeleton detection and tracking may further include tracking detected occupant extremities in the outside bounding box for persistency and a level of risky behavior. Performing body skeleton detection and tracking may be performed using algorithms known in the art, such as PoseNet, DeepPose, OpenPose, or other algorithms.

At decision 614, the example process 600 includes determining whether a risk exists due to detected extremities 613 extending out of a vehicle window, based on a calibratable threshold 607. Determining whether a risk exists due to detected extremities extending out of a vehicle window may include performing exterior risk assessment. Exterior risk assessment may include tracking persistence times during which extremities are detected as extending in the outside bounding box. Exterior risk assessment may include determining a maximum persistence time during which extremities are detected as extending in the outside bounding box, comparing the maximum persistence time to a calibratable threat threshold, and determining a risk level based on the comparison of the maximum persistence time to the calibratable threat threshold. When the maximum persistence time is less than the threat threshold, exterior risk assessment may include determining that the threat level is "No Risk". When the maximum persistence time is greater than the threat threshold, exterior risk assessment may include determining that the threat level is "At Risk".

When it is determined that a risk does not exist (no at decision 614), the example process includes doing nothing (operation 604). When it is determined that a risk does exists (yes at decision 614), the example process includes performing alert and risk mitigation operations (operation 616). Performing alert and risk mitigation may include determining a level of risk based on the type of detected and persistent extremities extended out of a window. Performing alert and risk mitigation and risk mitigation may include determining that the level of risk is high when a head, leg, or lower arm is detected as being extended out of a window. Performing alert and risk mitigation and risk mitigation may include determining that a level of risk is high when the occupant is a child or pet, and a seatbelt for the occupant is not buckled. Performing alert and risk mitigation and risk mitigation may include determining that the level of risk is low when fingers and/or a forearm is detected as being extended out of a window.

Performing alert and risk mitigation and risk mitigation may further include determining the type of risk mitigation action to undertake. Performing alert and risk mitigation and risk mitigation may include providing a driver with an alert and a recommendation to pull over when a high risk is detected. Performing alert and risk mitigation and risk mitigation may include providing a driver with an alert when a low risk is detected, and the occupant is a child or a pet with a buckled seat belt. Performing alert and risk mitigation and risk mitigation may include providing an occupant with an alert to avoid risky behavior when a low risk is detected, and the occupant is an adult. Performing alert and risk mitigation and risk mitigation may include deactivating window-up movement when risky behavior is detected.

Figure 7:
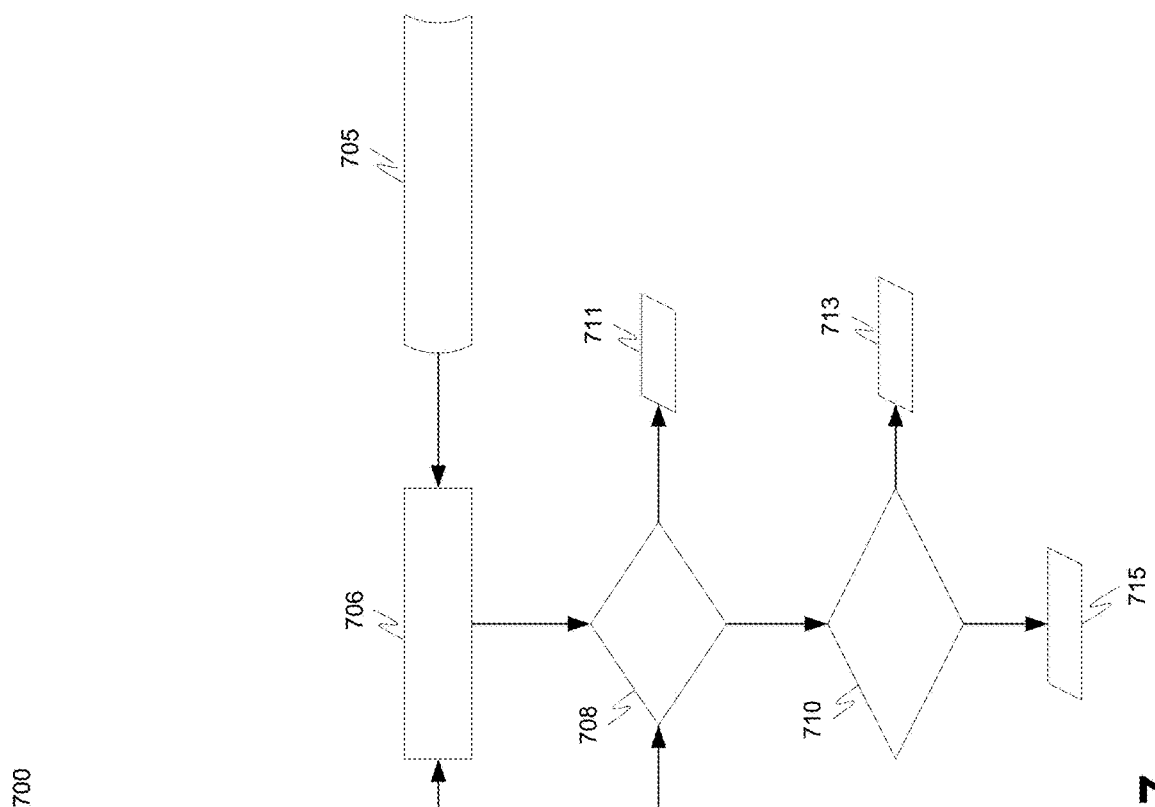
FIG. 7 is a process flow chart depicting an example process for determining a level of risk for a detected potential risk, in accordance with an embodiment.

FIG. 7 is a process flow chart depicting an example process 700 (e.g., in connection with an alert and risk mitigation module 208) for determining a level of risk for a detected potential risk. The order of operation within process 700 is not limited to the sequential execution as illustrated in the FIG. 7 but may be performed in one or more varying orders as applicable and in accordance with the present disclosure.

At operation 702, the example process 700 includes performing body skeleton detection and tracking using image data 701 (e.g., K-image sequences from vehicle side camera and/or interior cabin camera). Performing body skeleton detection and tracking may include generating a body skeleton (e.g., 2-D skeleton) for a human or pet occupant adjacent to a window based on the image data, detecting occupant extremities (e.g., forearm, fingers, lower arm, head, or legs) from the body skeleton, and detecting if occupant extremities extend outside of the vehicle. Performing body skeleton detection and tracking may be performed using algorithms known in the art, such as PoseNet, DeepPose, OpenPose, or other algorithms. Performing body skeleton detection and tracking may result in the generation of a two-dimensional (2D) skeleton.

At operation 704, the example process 700 includes detected extremity tracking. Performing detected extremity tracking may include tracking occupant extremities within an area of interest (AoI) 703, such as an outside bounding box 326 and/or an inside window bounding polygon 306. Performing detected extremity tracking may further include tracking detected occupant extremities in the AoI for persistency.

At operation 706, the example process 700 includes performing a persistence check. Performing a persistence check includes determining the persistence time duration t for detected extremities within the AoI within a calibratable time window w 705.

At decision 708, the example process 700 includes determining whether a maximum persistence time duration $t_{max}$ for a tracked extremity (e.g. Track ρ) is greater than a calibratable risk threshold $T_T$ 707. When the maximum persistence time duration $t_{max}$ for a tracked extremity is not greater than a calibratable risk threshold $T_T$ 707 ($t_{max} \leq T_T$) (no at decision 708), the example process 700 includes determining that no risk 711 exists. When the maximum persistence time duration $t_{max}$ for a tracked extremity is greater than a calibratable risk threshold $T_T$ 707 ($t_{max} > T_T$) (yes at decision 708), the example process 700 includes proceeding to decision 710.

At decision 710, the example process 700 includes determining whether the detected extremities within the AoI are higher risk extremities. Higher risk extremities may include a head, leg, or lower arm that is detected within the AoI. When the detected extremities within the AoI are not higher risk extremities (no at decision 710), the example process 700 includes determining that a low risk 713 exists. When the detected extremities within the AoI are higher risk extremities (yes at decision 710), the example process 700 includes determining that a high risk 715 exists.

FIG. 8 is a process flow chart depicting an example process 800 (e.g., in connection with an alert and risk mitigation module 208) for determining the type of risk mitigation efforts to undertake based on the determined risk level posed by a detected potential risk. The order of operation within process 800 is not limited to the sequential execution as illustrated in the FIG. 8 but may be performed in one or more varying orders as applicable and in accordance with the present disclosure.

At decision 802, the example process 800 includes determining whether a detected risk involves a high risk or a low risk. When the detected risk involves a low risk, the example process 800 includes, at operation 804, providing an alert for notifying the occupant or driver of the low risk activity. The alert may be a visual alert via a human machine interface (HMI) in the vehicle. The alert may be an audible alert via the HMI. Other forms of an alert are also possible.

When the detected risk is classified as high risk, the example process 800 includes, at operation 806, identifying an occupant class for the occupant engaged in the high risk activity. At decision 808, the example process 800 includes determining if the occupant class is an adult or a child/pet.

When the occupant class is an adult, the example process includes providing an alert to the occupant to terminate the risky behavior at operation 810, and deactivating window-up movement capability at operation 812.

When the occupant class is a child or pet, the example process includes determining, at decision 814, whether the occupant's seat belt is buckled. If the occupant's seat belt is unbuckled, the example process 800 involves providing, at operation 816, an alert to the driver regarding the risky behavior and recommending that the driver pull over until the risky behavior has stopped. The example process 800, after operation 816, further includes deactivating window-up movement capability at operation 812.

When the occupant class is a child or pet and the occupant's seat belt is buckled, the example process 800 involves providing an alert to the driver of the risky behavior at operation 818, and deactivating window-up movement capability at operation 812.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A risky behavior detection system in a vehicle for automatically detecting occupant risky behavior, the risky behavior detection system comprising a controller, the controller configured to:
   detect whether a vehicle occupant exists who may pose a risk;
   determine whether a detected vehicle occupant is engaged in potentially risky behavior in an area of interest (AoI);
   determine whether the potentially risky behavior poses an actual risk based on determining a maximum persistence time during which an extremity of the vehicle occupant is detected as extending outside of a vehicle window, comparing the maximum persistence time to a calibratable threat threshold, and determining a risk level based on a comparison of the maximum persistence time to the calibratable threat threshold;
   classify a level of risk when the potentially risky behavior poses an actual risk; and
   perform risk mitigation actions based on risk classification.

2. The risky behavior detection system of claim 1, wherein to detect whether a vehicle occupant exists who may pose a risk the controller is configured to determine whether a vehicle occupant is situated near a vehicle window and determine whether the vehicle window situated near the vehicle occupant is opened or closed.

3. The risky behavior detection system of claim 1, wherein to determine whether a detected vehicle occupant is engaged in potentially risky behavior in an AoI, the controller is configured to:
   determine an occupant class for the detected vehicle occupant from a received image of an interior view of the vehicle near a window;
   generate a body skeleton with one or more extremities when the detected vehicle occupant is a human or pet;
   track the one or more extremities from the body skeleton; and
   detect if the one or more extremities are situated within the AoI.

4. The risky behavior detection system of claim 3, wherein the AoI includes an inside window bounding polygon determined from internal vehicle sensors or an outside bounding box determined from exterior vehicle sensors.

5. The risky behavior detection system of claim 1, wherein to determine a risk level based on a comparison of the maximum persistence time to the calibratable threat threshold, the controller is configured to:
   identify a threat level as not being at risk when the maximum persistence time is less than the calibratable threat threshold; and
   identify a threat level as being at risk when the maximum persistence time is greater than the calibratable threat threshold.

6. The risky behavior detection system of claim 1, wherein to classify a level of risk when the potentially risky behavior poses an actual risk, the controller is configured to determine the level of risk based on an extremity type.

7. The risky behavior detection system of claim 6, wherein to determine the level of risk based on the extremity type, the controller is configured to:
   determine that the level of risk is high when the extremity type includes a head, leg, or lower arm; and
   determine that the level of risk is low when the extremity type includes a finger or forearm and not a head, leg, or lower arm.

8. The risky behavior detection system of claim 6, wherein to determine the level of risk based on the extremity type, the controller is configured to:
   determine that the level of risk is high when the vehicle occupant is a child or pet, and a seatbelt for the vehicle occupant is not buckled.

9. The risky behavior detection system of claim 1, wherein to perform risk mitigation actions based on risk classification, the controller is configured to:
   provide a vehicle driver with an alert and a recommendation to pull over when a high risk is detected;
   provide the vehicle driver with an alert when a low risk is detected, and the vehicle occupant is a child or a pet with a buckled seat belt;
   provide the vehicle occupant with an alert to avoid risky behavior when a low risk is detected, and the vehicle occupant is an adult; and
   deactivate window-up movement when risky behavior is detected.

10. A vehicle comprising:
   one or more interior image sensors;
   one or more exterior image sensors; and
   a controller configured to:
   detect whether a vehicle occupant exists who may pose a risk;
   determine whether a detected vehicle occupant is engaged in potentially risky behavior in an area of interest (AoI)

based on image data from the one or more interior image sensors or the one or more exterior image sensors;

determine whether the potentially risky behavior poses an actual risk based on determining a maximum persistence time during which an extremity of the vehicle occupant is detected as extending outside of a vehicle window, comparing the maximum persistence time to a calibratable threat threshold, and determining a risk level based on a comparison of the maximum persistence time to the calibratable threat threshold;

classify a level of risk when the potentially risky behavior poses an actual risk; and perform risk mitigation actions based on risk classification.

11. The vehicle of claim 10, wherein to determine whether a detected vehicle occupant is engaged in potentially risky behavior in an AoI, the controller is configured to:

determine an occupant class for the detected vehicle occupant from a received image of an interior view of the vehicle near a window;

generate a body skeleton with one or more extremities when the detected vehicle occupant is a human or pet;

track the one or more extremities from the body skeleton; and detect if the one or more extremities are situated within the AoI.

12. The vehicle of claim 10, wherein to determine a risk level based on a comparison of the maximum persistence time to the calibratable threat threshold, the controller is configured to:

identify a threat level as not being at risk when the maximum persistence time is less than the calibratable threat threshold; and identify a threat level as being at risk when the maximum persistence time is greater than the calibratable threat threshold.

13. The vehicle of claim 10, wherein the AoI includes an inside window bounding polygon determined from internal vehicle sensors or an outside bounding box determined from exterior vehicle sensors.

14. The vehicle of claim 10, wherein to perform risk mitigation actions based on risk classification, the controller is configured to:

provide a vehicle driver with an alert and a recommendation to pull over when a high risk is detected;

provide the vehicle driver with an alert when a low risk is detected, and the vehicle occupant is a child or a pet with a buckled seat belt;

provide the vehicle occupant with an alert to avoid risky behavior when a low risk is detected, and the vehicle occupant is an adult; and deactivate window-up movement when risky behavior is detected.

15. A method in a vehicle, comprising:

providing one or more interior image sensors;

providing one or more exterior image sensors;

detecting whether a vehicle occupant exists who may pose a risk;

determining whether a detected vehicle occupant is engaged in potentially risky behavior in an area of interest (AoI) based on image data from the one or more interior image sensors or the one or more exterior image sensors;

determining whether the potentially risky behavior poses an actual risk based on determining a maximum persistence time during which the extremity is detected as extending outside of the vehicle window, comparing the maximum persistence time to a calibratable threat threshold, and determining a risk level based on a comparison of the maximum persistence time to the calibratable threat threshold;

classifying a level of risk when the potentially risky behavior poses an actual risk; and performing risk mitigation actions based on risk classification.

16. The method of claim 15, wherein determining whether a detected vehicle occupant is engaged in potentially risky behavior in an AoI, comprises:

determining an occupant class for the detected vehicle occupant from a received image of an interior view of the vehicle near a window;

generating a body skeleton with one or more extremities when the detected vehicle occupant is a human or pet;

tracking the one or more extremities from the body skeleton; and detecting if the one or more extremities are situated within the AoI.

17. The method of claim 15, wherein determining a risk level based on a comparison of the maximum persistence time to the calibratable threat threshold comprises:

identifying a threat level as not being at risk when the maximum persistence time is less than the calibratable threat threshold; and identifying a threat level as being at risk when the maximum persistence time is greater than the calibratable threat threshold.

18. The method of claim 15, wherein classifying a level of risk when the potentially risky behavior poses an actual risk comprises determining the level of risk based on an extremity type and determining the level of risk based on the extremity type comprises determining that the level of risk is high when the extremity type includes a head, leg, or lower arm, and determining that the level of risk is low when the extremity type includes a finger or forearm and not a head, leg, or lower arm.

19. The method of claim 15, wherein performing risk mitigation actions based on risk classification comprises:

providing a vehicle driver with an alert and a recommendation to pull over when a high risk is detected;

providing the vehicle driver with an alert when a low risk is detected, and the vehicle occupant is a child or a pet with a buckled seat belt;

providing the vehicle occupant with an alert to avoid risky behavior when a low risk is detected, and the vehicle occupant is an adult; and deactivating window-up movement when risky behavior is detected.

20. The method of claim 15, wherein the AoI includes an inside window bounding polygon determined from internal vehicle sensors or an outside bounding box determined from exterior vehicle sensors.

* * * * *